United States Patent [19]

Greup et al.

[11] 4,348,417
[45] Sep. 7, 1982

[54] POTATO SNACK AND PREPARATION THEREOF

[75] Inventors: Dirk H. Greup, Voorburg; Willem Brouwer, Rijswijk, both of Netherlands

[73] Assignee: Gist-Brocades N.V., Delft, Netherlands

[21] Appl. No.: 868,303

[22] Filed: Jan. 10, 1978

Related U.S. Application Data

[63] Continuation of Ser. No. 732,777, Oct. 5, 1976, abandoned, which is a continuation-in-part of Ser. No. 696,504, Jun. 16, 1976, abandoned.

[30] Foreign Application Priority Data

Oct. 15, 1975 [GB] United Kingdom ............... 42329/75
Sep. 16, 1976 [GB] United Kingdom ............... 38446/76

[51] Int. Cl.$^3$ .............................................. A23L 1/00
[52] U.S. Cl. ...................................... 426/19; 426/20; 426/21; 426/440; 426/549; 426/560; 426/621; 426/808
[58] Field of Search ...................... 426/18, 19, 20, 21, 426/60, 554, 555, 808, 621, 440, 549, 560, 559

[56] References Cited

U.S. PATENT DOCUMENTS

| | | | |
|---|---|---|---|
| 2,701,200 | 2/1955 | Huber | 426/559 |
| 3,027,258 | 3/1962 | Markakis | 426/560 |
| 3,144,338 | 8/1964 | Burke et al. | 426/21 |
| 3,574,634 | 4/1971 | Singer | 426/20 |
| 3,752,675 | 8/1973 | Tsen et al. | 426/21 |

FOREIGN PATENT DOCUMENTS

1261730  1/1972  United Kingdom .

*Primary Examiner*—Thomas G. Wiseman
*Assistant Examiner*—Elizabeth A. Hatcher
*Attorney, Agent, or Firm*—Hammond & Littell, Weissenberger and Muserlian

[57] ABSTRACT

A process for the preparation of a novel potato snack product comprising mixing together a starch containing component, an active yeast, preferably baker's yeast, water and a sugar fermentable by the said yeast to form a dough mass, optionally dividing the dough into pieces, fermenting the dough mass or pieces for a period of time and temperature sufficient to form a light structure and frying in hot edible oil or fat or baking at ordinary oven temperatures the fermented dough or pieces to obtain a potato snack and the novel potato snacks formed thereby as well as a premix for said potato products.

17 Claims, No Drawings

POTATO SNACK AND PREPARATION THEREOF

PRIOR APPLICATION

This is a continuation of application Ser. No. 732,777 filed Oct. 5, 1976, now abandoned, which in turn is a continuation-in-part of our copending, commonly assigned patent application Ser. No. 696,504 filed June 16, 1976, now abandoned.

STATE OF THE ART

It is to be understood that the expression "potato snacks" as used herein is not to be confused with the ordinary product called "potato chips" which are rods or slices cut from unboiled potatoes which are baked in heated fat or oil, preferably in two stages. The product of this invention in one of its forms may show similarity with the product normally called "potato crisps", which is widely used as a snack with a drink. It may also show some similarity with another snack called "shoe strings".

The preparation of potato crisps is known per se, and according to one method described in British Pat. No. 1,261,730, a dough is prepared from starch-containing components, e.g. a mixture of potato flour and potato starch and the dough is compressed into flakes and the flakes are heated for 1 to 10 minutes in steam to obtain the well-known potato crisps in the form of flakes. Although the product is consumed in considerable amounts, and the method of preparation is simple, the method is less suitable to be carried out by, for example, house-wives who want to present their family with something special.

In another known method, potato snacks are prepared by mixing boiled potato flour with a mixture of gelatinized and non-gelatinized starch into a dough which, if desired, is divided into pieces. The pieces of dough are submerged in heated fat or oil with the result that their volume is increased 1.6 times, whereafter the baked pieces are removed from the fat or oil. This method is described in Dutch Patent Application No. 73.16093.

It is known from, for example, British Pat. No. 1,273,999 to add yeast to potato flour for the purpose of lowering the reducing sugar content in the potato flour before processing a dough into potato snacks. It is also known from British Pat. No. 1,316,148 to add yeast to flour and water for the purpose of developing, in conjunction with an acidified whey the necessary acidity of a dough containing other ingredients, which dough is held for a period up to 7 hours before processing into desired forms and then baked to give crackers, snack foods and like partially-leavened bakery products.

OBJECTS OF THE INVENTION

It is an object of the invention to provide a method for preparing potato snacks which can suitably be carried out on a commercial scale as well as by house-wives, and which results in a potato snack product of a light structure, having a superior taste and without a dominating oil taste.

It is another object of the invention to provide a premix which can suitably be used in the process.

It is a further object of the invention to provide novel potato snack products.

These and other objects and advantages of the invention will become obvious from the following detailed description.

THE INVENTION

The novel process of the invention for the preparation of potato snacks comprises mixing together a starch containing component, an active yeast, preferably baker's yeast, water and sugar fermentable by the said yeast to form a dough mass, optionally dividing the dough into pieces, fermenting the dough mass or pieces for a period of time and temperature sufficient to form a light structure and frying in hot edible oil or fat or baking at ordinary oven temperatures the fermented dough or pieces to obtain a potato snack. The baking of the fermented dough may be effected in edible frying oil or fat or in an oven at ordinary baking temperatures.

This process is very suitable to be carried out on a commercial or semi-commercial scale, i.e. by persons selling the product in stores or on the street or the beach, and is also easily carried out by house-wives. By the use of the baker's yeast, the product has a special structure and superior taste due to the products formed by the yeast and modified by the frying or baking process and moreover, the product does not have any substantial oily taste. By the fermentation, the final product has a very light structure which is appreciated for snacks and may be porous or hollow. An even lighter structure may be obtained by the addition of vegetable or animal proteins such as cheese, casein, anchovy paste or hydrolysed proteins.

By the term "starch-containing component" as used in this specification is meant any vegetable polymerized carbohydrate product. Examples of such carbohydrate products are potato flour and potato starch and corn, buckwheat, tapioca and rice flour, and soya meals, and mixture thereof. Preferred sources of starch are dried potato flour and potato starch.

The method is preferably effected with about 20 to 80%, preferably 40 to 60%, of dried potato flour, about 80 to 20%, preferably 60 to 40% of potato starch, based on the sum of the amounts of potato flour and starch, the said parts being by weight. This mixture may be partially replaced by a starch product of another origin.

The product called "dried potato flour" should not be confused with the product normally called "potato starch". By "dried potato flour" is meant dried mashed potatoes e.g. peeled potatoes that are gently crushed so as not to break the cells, and dried on drying cylinders or spray-dried. It is also possible to use a product obtained by boiling potatoes, mixing the boiled potatoes, after removal of the water, to a crumbly product and drying that product. Potato starch is a product obtained by drying the starch of potatoes at relatively low temperature so that gelatination of the starch does not occur.

It is advantageous to use the above indicated mixture of potato starches in order to obtain a dough that can suitably be handled or processed.

It is an advantage of the invention that starches other than those derived from the potato may be used. In years when the potato harvest is disappointing and potatoes become expensive, the replacement of potato starch in the snacks by, for example, corn starch may be considered.

The active yeast, preferably a bakers' yeast, as used in the method of the invention, is present in an amount of about 5 to about 20%, preferably about 8 to about 12%, by weight based on the amount of the starch-containing components in the mix. These percentages are indicated for so-called compressed bakers' yeast, a product normally containing about 70% of moisture. It is obvious that active dried bakers' yeast may also be used in such small amounts as will be indicated by its activity ratio as compared to the compressed form of yeast.

For fermenting the dough, a small amount of a sugar fermentable by the active yeast is used. Examples of suitable fermentable sugars are sucrose and glucose; sucrose is preferred. An amount of sugar of about 0.5 to about 5, preferably about 1 to about 4%, by weight based on the starch content of the mix is sufficient to obtain a suitable dough fermentation. Sugar that is not fermented in the dough is important for the color formation in the final snack, and the amount of sugar and yeast present in the dough may be adapted so that, after a predetermined fermentation time, the baked snack has the desired combination of structure and color. However, if the fermentation time is exceeded (e.g. by a production break) the coloration becomes too slight for consumer satisfaction. The coloration may vary from dark brown to a light 'potato chip like' color according to the amount of sugar in the divided pieces of dough before they are fried or baked, and/or the frying or baking conditions.

In one aspect of the invention, proteinaceous material is included in the mix from which the snacks are produced, the proteinaceous material replacing a part of the starch-containing component. The use of proteinaceous material is advantageous in order to obtain a snack having a more balanced ratio of carbohydrate and protein. Up to about 45%, preferably up to about 25%, by weight of the starch-containing component may be replaced by proteinaceous material.

Examples of suitable proteinaceous materials are vegetable proteinaceous materials such as gluten, soya protein isolate, soya protein isolate sodium salt, and hydrolysed proteins. When using corn starch or starch materials other than those derived from the potato, it is preferable to use a certain amount of gluten. When using soya meal, it is preferred to mix it with another starch-containing component, such as corn meal. A mixture of up to about 40% of soya meal and 60% of more of corn meal is very suitable when also using a certain amount of gluten.

Other taste improving components may also be added to the dough. Normally, a small amount of salt enhances the taste of the final product, but other components may also be added in small amounts such as spices, e.g. curry, paparica and/or meat spices. A small amount of a non-fermentable sugar such as lactose may also be added to give the final product a sweet taste, and a suitable color if desired. Furthermore, animal proteins may be added to obtain a still lighter structure and give the potato snack a special taste. Examples of useful proteins are cheese, anchovy paste, yeast extract, hashed meat, hydrolyzed proteins, etc.

According to a modification of the method for the production of snacks, instead of, or in addition to, the incorporation of sugar with the starch-containing material and active yeast there is used an enzyme capable of acting on the starch-containing component to form therefrom a sufficient amount of a sugar from the starch components fermentable by the active yeast, such as an amylase. An amount of about 20 to about 100 ppm, preferably about 30 to about 70 ppm, of amylase (preferably α-amylase), based on the content of the starch component, may be used. The use of an amylase may be of advantage for the color formation in the snacks. The addition of an enzyme to the mix instead of a sugar prolongs the fermentation time of the pieces of dough and this may be of advantage if there is a production break when the snacks are being produced.

Water is added in adapted amounts to obtain a satisfactory dough, e.g. about 50 to about 150 parts by weight of water per 100 parts of starch-containing component and, if present, proteinaceous material.

If desired, the dough may be divided up into pieces such as rods, flakes, wafer, stars or small balls or strings, or pieces obtained by some extrusion process, before the dough is fermented. Suitably, the dough is flattened to a sheet of 0.8 to 2.0 mm thick and the dried shapes maybe cut from the sheet.

Although the fermentation of the dough may be carried out at ambient temperatures, the dough is preferably fermented at somewhat increased temperatures, e.g. from about 20° to about 40° C., preferably from 25° to 35° C. The fermentation time depends on the temperature, but a fermentation period of about 5 to 45 minutes, preferably 5 to about 30 minutes, will normally be sufficient. A preferred range is 25°–35° C. for 30 to 40 minutes.

After fermentation, the dough is baked in a heated frying oil or fat or in an oven at normal baking temperatures. All oils or fats which are normally used for frying purposes may be used such as arachidic oil, cocoa oil and lard. Preferably, frying is used.

The thus baked pieces of product, generally of the usual size for potato snacks, are ready for consumption, but may, if desired, be salted or covered with powdered sugar or small amounts of dip sauces, etc. The product is a very fine-tasting snack which will be appreciated generally with drinks. The fat content of the product is preferably below about 25%, more preferably below 20%. When the pieces are baked, the fat content is nil.

According to another feature, the invention provides a pre-mix for preparing the potato snacks according to the invention. This pre-mix comprises significant proportions of a starch-containing component, optionally a proteinaceous water, active dried yeast (preferably bakers' yeast) and a sugar fermentable by said active dried bakers' yeast and/or an enzyme capable of forming such sugar. The amounts of the components to be used are as indicated hereinbefore.

This pre-mix, which may be sold, e.g. in stores etc., is very suitable to be used in the process when carried out by, for example, house-wives. It is sufficient to add some water, mix the moist composition into a dough, ferment the dough and bake it in heated frying oil or fat, and the housewives will not have to bother weighing the necessary amounts of components. Another advantage of the pre-mix is that it can be stored for relatively long periods of time provided that the pre-mix is stored in the unopened package (in a nitrogen atmosphere or in vacuo).

Since the pre-mix will normally be sold in packaged form, the invention also relates to an air-tight package containing the pre-mix. Care should be taken that the bakers' yeast in the package, which is the most sensitive component, will not be deactivated to a too great extent which may be achieved in several ways, e.g. by introducing a nitrogen atmosphere or a vacuum or, in a way similar to that described in commonly assigned U.S. Application Ser. No. 499,145 filed Aug. 21, 1974, by replacing the air in the package with an adsorbing gas, e.g. carbon dioxide, which is partially adsorbed by the contents of the package whereby when a flexible package material is used, a vacuum-like appearance of the package is obtained.

It will be obvious that the pre-mix may also contain additional components, e.g. those discussed hereinbefore. Those additional components are added in dry form, which is necessary for the stability of the yeast.

As indicated hereinbefore, the yeast to be used in the pre-mix is an active dried bakers' yeast, preferably one that is easily distributed into a dough when mixed in the starch components, and a suitable form of a useful active dried bakers' yeast is that described in British Pat. Nos. 1,230,205 or 1,321,714.

The invention further relates to the products as obtained by the method of the invention. These potato snack products, which are of a light structure, have a very good taste and are ready for consumption, although, if desired, they may be salted or covered with powdered sugar, garnished with dip-sauces, or filled with anchovy paste, yeast extract, TVP, cheese, hashed meat, etc., in the form of little filled cushions.

In the following examples there are described several preferred embodiments to illustrate the invention. However, it should be understood that the invention is not intended to be limited to the specific embodiments. All parts are by weight.

EXAMPLE 1

| Ingredients: | |
| --- | --- |
| dried potato flour | 50 parts |
| potato starch | 50 parts |
| sucrose | 2 parts |
| compressed bakers' yeast | 10 parts |
| salt | 2 parts |
| water | 120 parts |

About three quarters of the amount of water was heated to boiling and was added to 20 parts of the potato starch for gelatinization. The remainder of the water is used to dissolve the sugar and salt and to suspend the compressed yeast. The gelatinized potato starch, the sugar and salt solution and the yeast suspension were mixed with the dried potato flour and the remainder of the potato starch to form a homogeneous mass at a temperature of about 30° C. The dough was then divided into pieces of the desired size by extrusion, and the pieces were fermented for 10 to 15 minutes. The fermented pieces of dough were then baked in frying oil to a crispy product. The average fat content of several samples thus prepared was 18%, estimated by hexane extraction.

EXAMPLE 2

| Ingredients: | |
| --- | --- |
| dried potato flour | 80 parts |
| potato starch | 20 parts |
| sucrose | 2 parts |
| compressed bakers' yeast | 10 parts |
| salt | 2 parts |
| water | 120 parts |

The procedure of Example 1 was followed except that 10 parts of the potato starch were used for the gelatinization.

EXAMPLE 3

| Ingredients: | |
| --- | --- |
| dried potato flour | 20 parts |
| potato starch | 80 parts |
| sucrose | 4 parts |
| compressed bakers' yeast | 20 parts |
| salt | 2 parts |
| water | 120 parts |

The procedure of Example 1 was followed except that the fermentation time after extrusion was 10 minutes.

EXAMPLE 4

| Ingredients: | |
| --- | --- |
| dried potato flour | 25 parts |
| potato starch | 50 parts |
| pre-gelatinized starch | 5 parts |
| gluten | 20 parts |
| compressed bakers' yeast | 10 parts |
| α-amylase (50 000 SKB) | 50 ppm (based on the starch and protein content) |
| water | 60 parts |

The ingredients were mixed to form a homogeneous mass at about 30° C. and the dough was rolled into a sheet having a thickness of about 0.5 to about 2.0 mm. The sheet of dough was then divided into small elongated pieces of the desired sizes and forms, and fermented for 20 to 30 minutes at the same temperature. After fermentation, the pieces of dough are fried in heated oil to a crispy product.

EXAMPLE 5

The same procedure as described in Example 4, was followed except that 2 parts of sucrose were added to the recipe. After frying the pieces of fermented dough in heated oil, a crispy product was obtained.

EXAMPLE 6

| Ingredients: | |
| --- | --- |
| corn starch | 80 parts |
| gluten | 20 parts |
| sucrose | 2 parts |
| compressed bakers' yeast | 10 parts |
| water | 60 parts |

The ingredients were mixed to form a homogeneous dough at about 25° C. and the dough was rolled out into a sheet of a thickness of about 1 mm and then was divided into pieces having a width of about 10 mm and a length of about 50 mm. The dough pieces were fermented at the same temperature for about 40 minutes and fried in heated oil to a crispy product.

EXAMPLE 7

| Ingredients: | |
| --- | --- |
| buckwheat flour | 85 parts |
| gluten | 15 parts |
| sucrose | 4 parts |
| compressed bakers' yeast | 15 parts |

-continued

| Ingredients: | |
|---|---|
| water | 60 parts |

The ingredients were mixed to form a homogeneous dough at 25° C. and the dough was rolled into a sheet of 1 mm thickness. Dough pieces were cut out of the sheet with pastry cutters of several shapes with either plain or fluted edges (diameter of cutters 20 to 50 mm). The pieces of dough were then fermented at the same temperature for 25 to 30 minutes and then fried in heated oil to a crispy product.

EXAMPLE 8

| Ingredients: | |
|---|---|
| rice flour | 70 parts |
| gluten | 30 parts |
| sucrose | 2 parts |
| compressed bakers' yeast | 10 parts |
| water | 60 parts |

The ingredients were mixed to form a homogeneous mass at 30° C. and the dough was extruded through orifices of 3 to 5 mm diameter. The strands obtained were cut into pieces of about 50 mm in length and the dough pieces were fermented at the same temperature for about 25 minutes and then fried in heated oil to obtain a crispy product.

EXAMPLE 9

| Ingredients: | |
|---|---|
| tapioca flour | 100 parts |
| sucrose | 2 parts |
| compressed bakers' yeast | 10 parts |
| water | 80 to 100 parts |

The ingredients were mixed to form a homogeneous mass at 30° C. and then the dough was rolled into a sheet about 1 mm thick. The sheet was divided into pieces of the desired sizes, and then was fermented for 30 minutes at the same temperature. The fermented pieces of dough were fried in heated oil to obtain a crispy product.

Various modifications of the products and processes of the invention may be made without departing from the spirit or scope thereof and it is to be understood that the invention is to be limited only as defined in the appended claims.

We claim:

1. A process for the preparation of crispy snacks of light structure without an oily taste comprising mixing a composition consisting essentially of starch containing component selected from the group consisting of potato flour and potato starch, corn, buckwheat, tapioca, rice flour and soya meals and mixtures thereof, 5 to 20% by weight of an active yeast based on the starch containing component, water and 0.5 to 5% by weight of sugar fermentable by yeast based on the starch containing component and/or 20 to 100 ppm of an enzyme capable of forming such a sugar to form a dough mass, fermenting the dough mass for a period of time and temperature sufficient to form a light structure and frying the fermented dough to obtain a crispy snack of light structure.

2. The method of claim 1 wherein the starch containing component is dried potato flour and potato starch.

3. The method of claim 2 wherein the dried potato flour and potato starch are used in a ratio of about 20 to about 80% of dried potato flour, and about 80 to about 20% of potato starch, the said parts being by weight.

4. The method of claim 1 wherein the active yeast is present in an amount of about 5 to about 20% by weight based on the amount of starch-containing components in the mix.

5. The method of claim 1 wherein the sugar is sucrose or glucose.

6. The method of claim 1 wherein the amount of sugar used is about 1 to about 4% by weight based on the starch content of the mix.

7. The method of claim 1 wherein the starch-containing component is replaced by a proteinaceous material up to about 45% by weight of the starch-containing component.

8. The method of claim 7 wherein the proteinaceous material is a vegetable proteinaceous material selected from the group consisting of gluten, soya protein isolate, soya protein isolate sodium salt and hydrolyzed proteins.

9. The method of claim 1 wherein instead of, the incorporation of sugar with the starch-containing component and active yeast there is used an enzyme capable of acting on the starch-containing component to form therefrom a sufficient amount of a sugar from the starch components fermentable by the active yeast.

10. The method of claim 9 wherein an amount of about 20 to about 100 ppm of amylase, based on the content of starch component, is used.

11. The method of claim 1 wherein taste improving agents are used.

12. The method of claim 1 wherein before fermenting the dough, it is divided up into pieces.

13. The method of claim 12 wherein the dough is flattened to a sheet 0.5 to 2 mm thick and the desired shapes of the pieces are produced from the sheet.

14. The method of claim 1 wherein the pieces of dough are fermented at increased temperatures from about 20° to about 40° C., for a period of about 5 to about 45 minutes.

15. The method of claim 14 wherein the pieces of dough are fermented at 25° to 35° C. for 30 to 40 minutes.

16. Snacks prepared by the method of claim 1.

17. Snacks prepared by the method of claim 1 wherein the fat content is below about 25% by weight.

* * * * *